May 24, 1955     R. C. FREVIK ET AL     2,708,865
REPLACEABLE POINT FOR STRIP SHARES
Filed Nov. 23, 1951
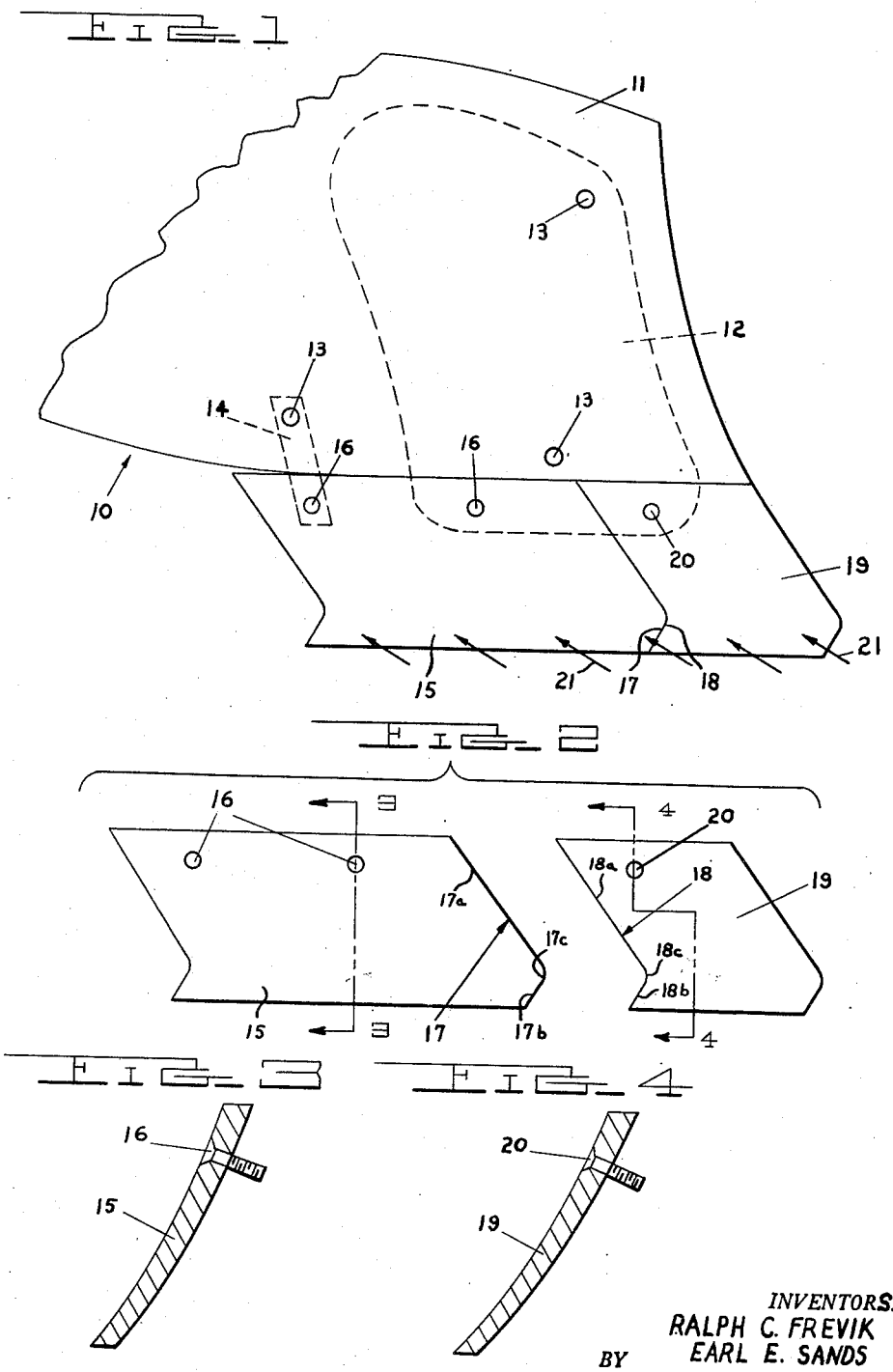
INVENTORS.
RALPH C. FREVIK
EARL E. SANDS
BY
ATTORNEY

United States Patent Office 2,708,865
Patented May 24, 1955

2,708,865

REPLACEABLE POINT FOR STRIP SHARES

Ralph C. Frevik and Earl E. Sands, Detroit, Mich., assignors, by mesne assignments, to Ford Motor Company, Dearborn, Mich., a corporation of Delaware Application November 23, 1951, Serial No. 257,841

1 Claim. (Cl. 97—125)

The present invention relates to a replaceable point for strip-type shares for moldboard plows and more particularly to a two-piece share wherein the share wing and point are formed from identical rolled strip stock.

The instant application is a continuation in part of our pending application for patent filed June 23, 1951, Serial No. 233,174, now abandoned, and assigned to the assignee of the instant application.

In our earlier application, we have disclosed the provision of strip-type shares formed by the shearing of strip stock which is rolled to the desired cross-sectional configuration at the rolling mill. The present invention provides a generally similar share wherein the share point is of the identical cross-sectional configuration of the wing, and a single bolt is utilized for retaining the point on the plow in longitudinal alignment with the wing. The leading and trailing edges of both the point and the wing are of identical wedge-shaped configuration, so that the trailing edge of the point snugly abuts the leading edge of the wing when the same are assembled on the plow. The wing and point are thus mutually supporting with the wing support of the share preventing rotational movement of the point about the single point bolt. Further, the line of juncture between the wing and the point at the lowermost or cutting edge of the share is inclined normally with respect to the direction of soil flow over the share to prevent the wedging of trash, sod and the like therebetween.

It is, therefore, an important object of the present invention to provide an improved plow share having a wing and a separate replaceable point adapted for mutual support during use to aid in the prevention of relative movement of the share components.

Another important object is the provision of a strip-type plow share including a share wing and a share point of identical cross-sectional configuration and having mating abutting edges providing for the mutual support of the share components throughout the entire abutting areas thereof.

It is a further object to provide an improved two-piece plow share including a relatively short share point adapted to be affixed to a plow bottom at a single attachment point in snugly abutting relation to a share wing, so that the wing supports the point to resist pivoting movement of the point about its attachment point, while accommodating use of the wing alone as a short share.

Still another important object of the present invention is the provision of a replaceable plow share comprising a wing having a tapered leading edge adapted for snugly abutting a correspondingly tapered trailing edge of a replaceable share point and, alternatively adapted, in the absence of the separate share point, to serve as an integral point of the short share defined by the wing alone.

The specific nature of this invention, as well as other objects and advantages thereof, will become apparent to those skilled in the art from the following detailed description, taken in conjunction with the one sheet of drawings on which, by way of preferred example only, is illustrated one embodiment of this invention.

On the drawings:

Figure 1 is a fragmentary side elevational view of a plow bottom provided with a two-piece share of the present invention;

Figure 2 is an exploded elevational view of the share alone;

Figure 3 is a sectional view taken along the plane 3—3 of Figure 2; and

Figure 4 is a sectional view taken along the plane 4—4 of Figure 3.

As shown on the drawings:

In Figure 1, reference numeral 10 refers generally to a moldboard plow bottom including a moldboard 11 secured to a frog 12 by suitable means, as by bolts 13. The moldboard is provided adjacent its lower edge with a depending wing strap 14 which, in combination with the frog 12, serves to secure a strip-type share wing 15 thereto by suitable means, as by bolts 16. The leading edge 17 of the wing 15 abuts the trailing edge 18 of a removable and separate share point 19. The point 19 is secured to the frog 12 by means of a single bolt 20 located in spaced relation to the trailing edge 18 of the point and in substantial longitudinal alignment with the bolts 16 retaining the wing 15 on the bottom 10.

Both the wing 15 and the point 19 along their upper edges abut the undersurface of the moldboard 11 to retain the wing and the point against upward displacement. Further, the wing and the point are in flatwise abutment with the lower exterior surface of the frog, so that further rigidification of the share results.

In Figure 2, it will be seen that the leading and trailing edges of the point 19 and the wing 15 are of identical configuration. For example, the leading edge 17 of the wing 15 comprises an upper downwardly and forwardly inclined surface 17a and a lower downwardly and rearwardly inclined surface 17b joined by an intermediate portion 17c of relatively short radius. Similarly, the trailing edge 18 of the point 19 is composed of an upper portion 18a, a lower portion 18b and an intermediate portion 18c, the entire edge 18 being of exactly the same contour as the leading edge 17 of the wing 15. In addition, the leading edge of the point 19 is identical with the leading edge 17 of the wing 15 and the trailing edge of the wing 15 is identical to the trailing edge 18 of point 19.

The exactly conforming contour of the leading and trailing edges makes possible the formation of the point and the wing by the utilization of the same dies, while fabrication of the share is further standardized by the formation of both the wing and the point from rolled stock of identical cross-sectional contour. Thus, the share may be formed by merely shearing rolled strip stock, the final cross-section of which is fixed by the rolling of the stock at the mill. The resulting advantages in ease of fabrication and reduced expense of manufacture will be readily appreciated. The identical cross-sectional configuration of the point and the wing are illustrated in Figures 3 and 4 of the drawings.

By the formation of the leading and trailing edges of both the wing and the point to an identical configuration, certain other advantages are obtained. For example, the wing 15 may be utilized as a short share. The commercial adaptation of the present invention proposes that the wing be of proper dimensions to form a ten inch share when utilized alone, the wing being moved forwardly so that the leading edge 17 thereof projects beyond the moldboard shin and the forward one of the share bolts 16 being inserted in place of the bolt 20 and the rearmost of the bolts 16 being inserted in the place of the forward bolt 16. The strap 14 may then be removed from the frog 12, and the wing 15 thus forms the shorter share. Therefore, a short (ten inch) share is defined by the wing alone, and a longer share (e. g., a fourteen inch share) is defined by the use of both the wing and the point.

Another advantage obtained by utilization of the identical leading and trailing edges is the provision of the inclined surfaces 17a and 17b in spaced relation to the bolt 20 of the point 19. Inasmuch as a single bolt is utilized, any movement of the point must take place about this bolt. Such movement is resisted by the mating surfaces of the leading edges of the wing 15 and the trailing edges of the point 19, as well as by abutment of the upper surface of the point with the undersurface of the moldboard 11. Further, the surfaces 17b and 18b are so inclined relative to the bottom edge of the share that they are substantially normal to the direction of soil flow over the share as illustrated by the directional arrows 21 of Figure 1.

Thus it will be appreciated that the present invention provides a new and novel two-piece strip-type plow share including separate wing and point components adapted for longitudinal alignment at the lowermost edge of a moldboard and for independent attachment to the plow frog. The share components are mutually supporting to resist displacement thereof by soil forces acting thereon. Also, the wing may be utilized alone as a short share or, with the point, as a long share provided with a low cost easily replaceable share point. The inclination of the bottom mating edges of the wing leading edge and the point trailing edge, so that the entry of sod, trash or the like therebetween is prevented, also constitutes a notable advantage of the present invention.

Of particular interest in the economical manufacture and sale of the share is the utility of identical dies to form the share components from the same strip stock, while the utility of strip stock of identical cross-sectional configuration aids in insuring mutual support and adequate lateral bracing of the point and the share. Still another commercial advantage resides in the possibility of using an unpolished share point with a polished share wing. Since the point will be much more rapidly worn, the point will become polished after a very short use period and no substantial loss of scouring will result. On the other hand, the wing will wear more slowly and should initially be polished to obtain adequate scouring. Thus, the primary replacement part, i. e., the point, may be more cheaply supplied by eliminating the polishing operation, while no loss of scouring on the share wing results since this part may be separately polished.

It will, of course, be understood that various details of construction may be varied through a wide range without departing from the principles of this invention and it is, therefore, not the purpose to limit the patent granted hereon otherwise than necessitated by the scope of the appended claim.

We claim:

For use with a moldboard plow having a frog and a moldboard secured to said frog, said moldboard having a longitudinally extending lower edge and said frog extending below said lower edge of said moldboard, the improvement of a two-piece share, said share comprising a share wing and a separate share point of identical and uniform cross-sectional configuration, bolt means for securing said wing to said frog, and a single bolt for mounting said point on said frog in longitudinal alignment with said wing, the upper edges of said wing and said point each snugly abutting the undersurface of said moldboard, the free lower edge of said wing and said point cooperably defining a smooth and unbroken share cutting edge, said point and said wing each having leading and trailing edges of identical configuration with the trailing edge of said point snugly abutting the leading edge of said wing when the same are mounted on the plow, each of said leading and trailing edges of said wing and said point having downwardly and forwardly inclined upper portions, and downwardly and rearwardly inclined lower portions intermediate the height of said share, the juncture of said portions at the trailing edge of said point being located in vertically spaced relation to said single bolt and generally therebeneath, so that said inclined portions of said point in abutting the corresponding inclined portions of said wing prevent movement of said point and the lower downwardly and rearwardly inclined abutting portions of said point trailing edge and said wing leading edge being substantially normal to the direction of soil flow over said share to prevent the wedging of trash therebeneath, thereby preventing retardation of the flow of soil along and over said share.

References Cited in the file of this patent

UNITED STATES PATENTS

| | | |
|---|---|---|
| 160,094 | Hampe | Feb. 23, 1875 |
| 392,047 | Lysle | Oct. 30, 1888 |
| 520,480 | Bunnell | May 29, 1894 |
| 534,471 | Franken | Feb. 19, 1895 |
| 1,176,892 | Harrison | Mar. 28, 1916 |
| 2,280,681 | Altgelt | Apr. 21, 1942 |

FOREIGN PATENTS

| | | |
|---|---|---|
| 4,165/31 | Australia | Nov. 22, 1932 |